United States Patent
Starner et al.

(10) Patent No.: US 8,997,013 B2
(45) Date of Patent: Mar. 31, 2015

(54) MULTIPLE GRAPHICAL KEYBOARDS FOR CONTINUOUS GESTURE INPUT

(71) Applicant: Google Inc., Mountain View, CA (US)

(72) Inventors: Thad Eugene Starner, Atlanta, GA (US); Nirmal Patel, Mountain View, CA (US); Shumin Zhai, Los Altos, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/907,602

(22) Filed: May 31, 2013

(65) Prior Publication Data

US 2014/0359513 A1     Dec. 4, 2014

(51) Int. Cl.
- *G06F 17/00* (2006.01)
- *G06F 3/0481* (2013.01)
- *G06F 3/0488* (2013.01)

(52) U.S. Cl.
CPC .......... *G06F 3/0481* (2013.01); *G06F 3/04886* (2013.01)
USPC .......................................................... 715/773

(58) Field of Classification Search
CPC ........................ G06F 3/04883; G06F 3/04886
See application file for complete search history.

(56) References Cited

U.S. PATENT DOCUMENTS

| | | | |
|---|---|---|---|
| 5,825,362 A | 10/1998 | Retter | |
| 6,286,064 B1 | 9/2001 | King et al. | |
| 6,292,179 B1 | 9/2001 | Lee | |
| 6,359,572 B1 | 3/2002 | Vale | |
| 6,801,190 B1 | 10/2004 | Robinson et al. | |
| 7,030,863 B2 | 4/2006 | Longe et al. | |
| 7,042,443 B2 | 5/2006 | Woodard et al. | |
| 7,075,520 B2 | 7/2006 | Williams | |
| 7,088,345 B2 | 8/2006 | Robinson et al. | |
| 7,098,896 B2 | 8/2006 | Kushler et al. | |
| 7,145,554 B2 | 12/2006 | Bachmann | |
| 7,151,530 B2 | 12/2006 | Roeber et al. | |
| 7,199,786 B2 | 4/2007 | Suraqui | |
| 7,250,938 B2 | 7/2007 | Kirkland et al. | |
| 7,251,367 B2 | 7/2007 | Zhai | |
| 7,277,088 B2 | 10/2007 | Robinson et al. | |
| 7,453,439 B1 | 11/2008 | Kushler et al. | |
| 7,508,324 B2 | 3/2009 | Suraqui | |
| 7,706,616 B2 | 4/2010 | Kristensson et al. | |

(Continued)

OTHER PUBLICATIONS

U.S. Appl. No. 60/430,338, by Daniel Suraqui, filed Nov. 29, 2002.

(Continued)

*Primary Examiner* — Keith Bloomquist
(74) *Attorney, Agent, or Firm* — Shumaker & Sieffert, P.A.

(57) ABSTRACT

In one example, a method includes outputting, by a computing device and for display, a graphical user interface comprising a first graphical keyboard comprising a first plurality of keys. The method further includes determining, based at least in part on an input context, to output a second graphical keyboard comprising a second plurality of keys, and outputting, for contemporaneous display with the first graphical keyboard, the second graphical keyboard. A character associated with at least one key from the second plurality of keys may be different than each character associated with each key from the first plurality of keys. The method further includes selecting, based at least in part on a first portion of a continuous gesture, a first key from first graphical keyboard, and selecting, based at least in part on a second portion of the continuous gesture, a second key from the second graphical keyboard.

14 Claims, 9 Drawing Sheets

(56) References Cited

U.S. PATENT DOCUMENTS

| | | | |
|---|---|---|---|
| 7,716,579 B2 | 5/2010 | Gunn et al. | |
| 7,750,891 B2 | 7/2010 | Stephanick et al. | |
| 7,921,361 B2 | 4/2011 | Gunn et al. | |
| 8,036,878 B2 | 10/2011 | Assadollahi | |
| 8,135,582 B2 | 3/2012 | Suraqui | |
| 8,327,282 B2 | 12/2012 | Arscott et al. | |
| 2004/0140956 A1 | 7/2004 | Kushler et al. | |
| 2005/0210402 A1* | 9/2005 | Gunn et al. | 715/773 |
| 2006/0119582 A1 | 6/2006 | Ng et al. | |
| 2006/0176283 A1 | 8/2006 | Suraqui | |
| 2008/0316183 A1 | 12/2008 | Westerman et al. | |
| 2009/0189864 A1 | 7/2009 | Walker et al. | |
| 2011/0122081 A1* | 5/2011 | Kushler | 345/173 |
| 2011/0258565 A1* | 10/2011 | Arscott et al. | 715/763 |
| 2012/0036469 A1 | 2/2012 | Suraqui | |
| 2013/0205242 A1* | 8/2013 | Colby | 715/773 |
| 2013/0227460 A1* | 8/2013 | Jawerth et al. | 715/773 |

OTHER PUBLICATIONS

U.S. Appl. No. 60/505,724, by Daniel Suraqui, filed Sep. 22, 2003.

Lomas, "Hey Apple, What the Next iPhone Really, Really Needs is a Much Better Keyboard," posted on Apr. 21, 2013, http://techcrunch.com/2013/04/21/the-iphone-keyboard-stinks/?, 6 pgs.

"Touch-It Virtual Keyboard," Latest releases: 4.9.7, Jun. 15, 2012, Retrieved from the Internet at http://www.chessware.ch/virtual-keyboard/, 3 pp.

Bao et al., "Smart Phone Use by Non-Mobile Business Users," Mobile HCI Aug. 30-Sep. 2, 2011, Retrieved from the Internet at http://people.ucsc.edu/~swhittak/papers/MobileHCI2011_FINAL.pdf, 10 pp.

International Search Report and Written Opinion from International Application No. PCT/US2014/039805, mailed Sep. 26, 2014, 12 pages.

* cited by examiner

MULTIPLE GRAPHICAL KEYBOARDS FOR CONTINUOUS GESTURE INPUT

BACKGROUND

Some computing devices (e.g., mobile phones, tablet computers) may output a graphical keyboard for display as part of a graphical user interface for receiving text input (e.g., using a presence-sensitive input device and/or display, such as a touchscreen). The graphical keyboard may enable a user of the computing device to enter text (e.g., an e-mail, a text message, or a document). For instance, a display device of a computing device may output a graphical (or "soft") keyboard that enables the user to enter data by indicating at a presence-sensitive input device (e.g., by tapping) keys displayed at the display device. In some examples, the data may indicate a password used to access applications and/or services provided by the computing device.

Gesture-based keyboards may be used to input text into a computing device, such as a smartphone. For instance, a computing device may receive indications of continuous gesture input based on detected gesture to select multiple keys of a graphical keyboard (e.g., without removing an input unit from the presence-sensitive input device). Gesture-based keyboards may suffer from limitations, for example, when a computing device receives indications of user input to enter certain types of text that include non-alphabetic characters such as numbers and/or symbols (e.g., passwords). In some examples, prediction, auto-correction, and/or a layout of the graphical keyboard may diminish an ability of the computing device to select such character strings that include non-alphabetic characters based on continuous gesture input.

SUMMARY

In one example, a method includes outputting, by a computing device and for display, a graphical user interface comprising a first graphical keyboard comprising a first plurality of keys, each key from the first plurality of keys associated with a respective character from a first plurality of characters. The method further includes determining, by the computing device and based at least in part on an input context, to output a second graphical keyboard comprising a second plurality of keys, each key from the second plurality of keys associated with a respective character from a second plurality of characters, wherein at least one character from the second plurality of characters is different than each character from the first plurality of characters. The method further includes outputting, by the computing device and for contemporaneous display with the first graphical keyboard, the second graphical keyboard. The method further includes receiving, by the computing device, an indication of a first portion of a continuous gesture detected at a presence-sensitive input device, and selecting as a first selected key, by the computing device and based at least in part on the first portion of the continuous gesture, a first key from the first plurality of keys of the first graphical keyboard. The method further includes receiving, by the computing device, an indication of a second portion of the continuous gesture detected at the presence-sensitive input device, and selecting as a second selected key, by the computing device and based at least in part on the second portion of the continuous gesture, a second key from the second plurality of keys of the second graphical keyboard.

In one example, a device includes at least one processor and at least one module operable by the at least one processor to output, for display, a graphical user interface comprising a first graphical keyboard comprising a first plurality of keys. The at least one module is further operable by the at least one processor to determine, based at least in part on an input context, to output a second graphical keyboard comprising a second plurality of keys, and output, for contemporaneous display with the first graphical keyboard, the second graphical keyboard, wherein a character associated with at least one key from the second plurality of keys is different than each character associated with each key from the first plurality of keys. The at least one module is further operable by the at least one processor to receive an indication of a first portion of a continuous gesture detected at a presence-sensitive input device, and select, based at least in part on the first portion of the continuous gesture, a first key from the first plurality of keys of the first graphical keyboard as a first selected key. The at least one module is further operable by the at least one processor to receive an indication of a second portion of the continuous gesture detected at the presence-sensitive input device, and select, based at least in part on the second portion of the continuous gesture, a second key from the second plurality of keys of the second graphical keyboard as a second selected key.

In one example, a computer-readable storage medium encoded with instructions that, when executed, cause at least one processor of a computing device to output, for display, a graphical user interface comprising a first graphical keyboard comprising a first plurality of keys. The computer-readable storage medium is further encoded with instructions that, when executed, cause the at least one processor of the computing device to determine, based at least in part on an input context, to output a second graphical keyboard comprising a second plurality of keys, and output, for contemporaneous display with the first graphical keyboard, the second graphical keyboard, wherein a character associated with at least one key from the second plurality of keys is different than each character associated with each key from the first plurality of keys. The computer-readable storage medium is further encoded with instructions that, when executed, cause the at least one processor of the computing device to receive an indication of a first portion of a continuous gesture detected at a presence-sensitive input device, and select, based at least in part on the first portion of the continuous gesture, a first key from the first plurality of keys of the first graphical keyboard as a first selected key. The computer-readable storage medium is further encoded with instructions that, when executed, cause the at least one processor of the computing device to receive an indication of a second portion of the continuous gesture detected at the presence-sensitive input device, and select, based at least in part on the second portion of the continuous gesture, a second key from the second plurality of keys of the second graphical keyboard as a second selected key.

The details of one or more examples of the disclosure are set forth in the accompanying drawings and the description below. Other features, objects, and advantages will be apparent from the description and drawings, and from the claims.

DETAILED DESCRIPTION

Figure 1:
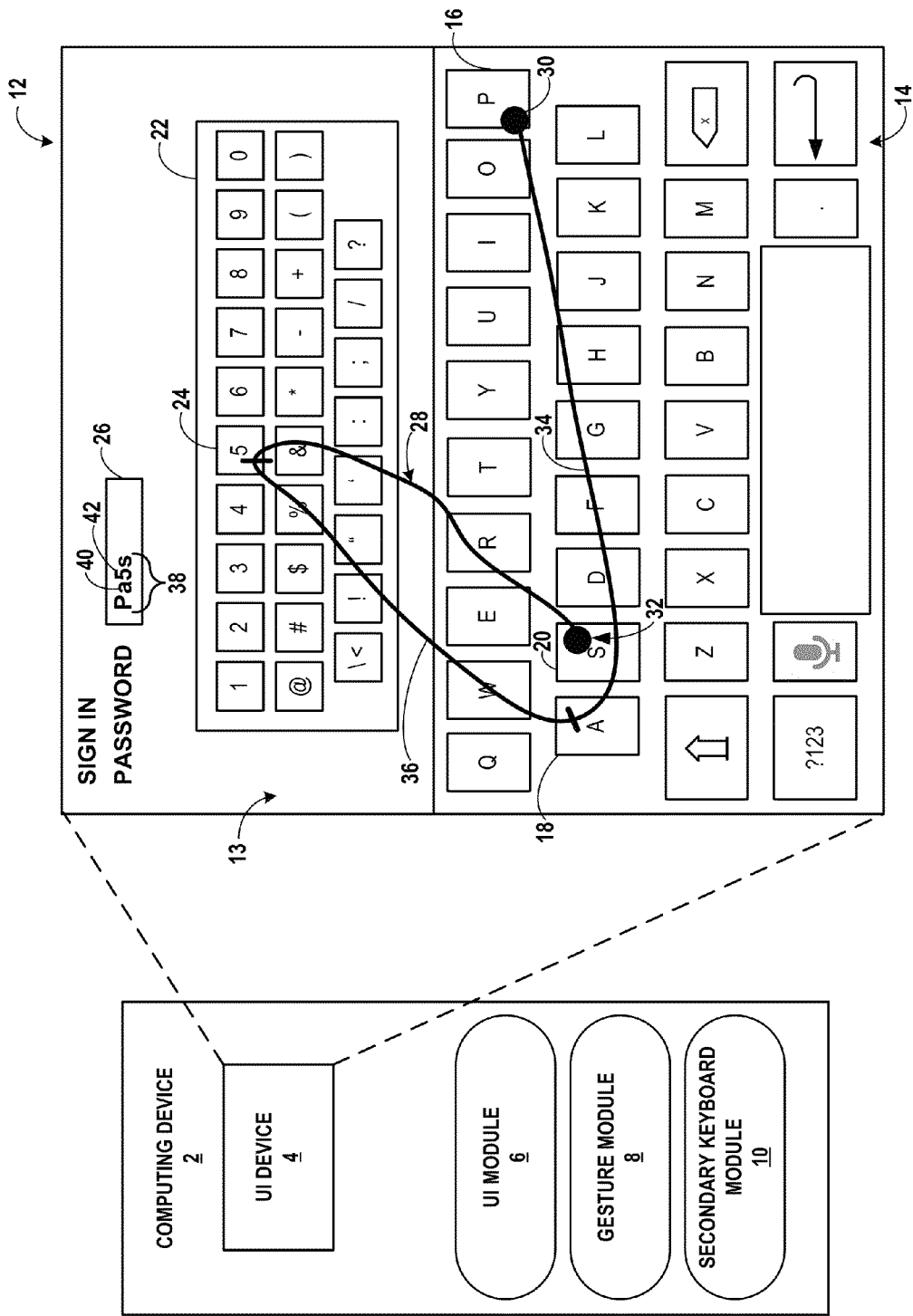
FIG. 1 is a block diagram illustrating an example computing device that may be used to output a second graphical keyboard for contemporaneous display with a first graphical keyboard, in accordance with one or more aspects of this disclosure.

In general, this disclosure is directed to techniques that may improve the ease with which a user may enter text using a gesture-based graphical keyboard. For example, a computing device may output for display (e.g., at a display device, such as a presence-sensitive display), a graphical user interface (GUI) including a first graphical keyboard that includes a first plurality of keys. The first graphical keyboard output for display by the computing device may enable a user to provide gesture input (e.g., at a presence-sensitive input device) in the form of one or more continuous gestures to select keys of the first graphical keyboard. For instance, the presence-sensitive input device may detect continuous gesture input including movement of an input unit (e.g., a finger, pen, stylus) from a first location of the presence-sensitive input device to a second location of the presence-sensitive input device. In response to receiving an indication of the continuous gesture input, the computing device may select one or more keys of the first graphical keyboard as selected keys, such as by comparing the indication of the continuous gesture input to one or more of a spatial and/or language model.

According to techniques of this disclosure, the computing device may enable a user to provide continuous gesture input to select a combination of alphabetic characters and non-alphabetic characters (e.g., number characters, symbol characters). Rather than requiring a separate user input to initiate the display of such non-alphabetic characters, thereby potentially requiring an interruption in the continuous gesture (e.g., providing a second disjoint user input) to initiate such display, a computing device implementing techniques of this disclosure may determine, based at least in part on an input context, to output a second graphical keyboard comprising a second plurality of keys. A character associated with at least one key from the second plurality of keys may be different than each character associated with each key from the first plurality of keys. For instance, one or more keys of the second graphical keyboard may be associated with a non-alphabetic character, such as a number character, that is different than each character associated with each key of the first graphical keyboard. The context may include, for example, an identifier of an input region of the GUI, such as an identifier of a password region, a uniform resource locator (URL) region, an email address region, a date region, and the like.

The computing device may output the second graphical keyboard for contemporaneous display with the first graphical keyboard, such as by outputting the second graphical keyboard as an alpha-blended graphical overlay of one or more portions of the GUI that do not include the first graphical keyboard (e.g., a text suggestion region of the GUI, a text display region of the GUI). In this way, use of a computing device implementing techniques described herein may enable a user to provide continuous gesture input to select one or more keys of the first graphical keyboard and one or more keys of the second graphical keyboard. For example, the computing device may select a first key of the first graphical keyboard in response to receiving a first portion of a continuous gesture, and may select a second key of the second graphical keyboard in response to receiving a second portion of the continuous gesture input.

Accordingly, techniques of this disclosure may enable a computing device to receive continuous gesture input to select a combination of alphabetic and non-alphabetic characters, without necessarily requiring an interruption in the continuous gesture to initiate display of a second graphical keyboard associated with the non-alphabetic characters. As such, techniques described herein may improve the ease with which a user may enter text, such as passwords, URLs, email addresses, dates, colors, etc. using the computing device, thereby potentially improving usability of the computing device.

FIG. 1 is a block diagram illustrating an example computing device 2 that may be used to output a second graphical keyboard for contemporaneous display with a first graphical keyboard, in accordance with one or more aspects of this disclosure. In some examples, computing device 2 may be associated with a user that may interact with computing device 2 by providing various user inputs to the computing device. Examples of computing device 2 may include, but are not limited to, portable or mobile devices such as mobile phones (including smartphones), laptop computers, desktop computers, tablet computers, smart television platforms, personal digital assistants (PDA's), servers, and mainframes. Computing device 2, in some examples, may include user interface (UI) device 4, UI module 6, gesture module 8, and secondary keyboard module 10. Other examples of computing device 2 that implement techniques of this disclosure may include additional components not shown in FIG. 1.

Computing device 2 may include UI device 4. In some examples, UI device 4 is configured to receive tactile, audio, or visual input. Examples of UI device 4 may include a touch-sensitive and/or a presence-sensitive screen, mouse, keyboard, voice responsive system, microphone, camera or other device for receiving input. For example, UI device 4 may include a presence-sensitive display that may detect the presence of an input unit (e.g., a finger, pen, stylus, and the like) performing one or more gestures. As further illustrated in FIG. 3, a presence-sensitive display may include a presence-sensitive input device and a display device. UI device 4 may output for display content such as graphical user interface (GUI) 12. GUI 12 may include one or more portions, such as a portion that includes first graphical keyboard 14, a portion that includes text display region 13, a portion that includes one or more text suggestion regions (not illustrated), or other portions and/or regions.

As shown in FIG. 1, computing device 2 may include UI module 6. UI module 6 may perform one or more functions to receive input, such as user input, and send indications of such input to other components associated with computing device 2, such as gesture module 8 and secondary keyboard module 10. UI module 6 may also receive data from components associated with computing device 2, such as gesture module 8 and secondary keyboard module 10. Using the data, UI module 6 may cause components associated with computing device 2, such as UI device 4, to provide output based on the data. For instance, UI module 6 may receive data from secondary keyboard module 10, and may cause UI device 4 to display GUI 12 based on such data, such as by causing UI device 4 to display secondary keyboard 22 in accordance with techniques described herein. In some examples, UI module 6 may include functionality associated with one or more applications executable by computing device 2, such as one or more of a word-processing application, text messaging application, spreadsheet, web browser, server application, or other applications. In certain examples, UI module 6 may be implemented as an application executable by one or more processors of computing device 2, such as a downloadable or pre-installed application or "app." In some examples, UI module 6 may be implemented as part of a hardware unit of computing device 2. As another example, UI module 6 may be implemented as part of an operating system of computing device 2.

As shown in FIG. 1, GUI 12 may be an interface generated by UI module 6 to enable a user to interact with computing device 2. GUI 12 may include graphical content. Graphical content, generally, may be any visually displayable graphical object of a graphical user interface. Examples of graphical content may include text, images, a group of moving images, hyperlink, animation, video, characters of a character set etc. As shown in FIG. 1, graphical content may include first graphical keyboard 14, second graphical keyboard 22, text display region 13, and password region 26.

Each of first graphical keyboard 14 and second graphical keyboard 22 may include a plurality of keys. For instance, first graphical keyboard 14 may include a first plurality of keys, including alphabetic keys such as "P" key 16, "A" key 18, and "S" key 20. Second graphical keyboard 22 may also include a second plurality of keys, such as non-alphabetic keys (e.g., number and/or symbol keys), such as "5" key 24. A character associated with at least one key from the second plurality of keys included in second graphical keyboard 22 may be different than each character associated with each key from the first plurality of keys of first graphical keyboard 14. For instance, as illustrated in the example of FIG. 1, a numeric "5" character associated with "5" key 24 is different than each character associated with each key of first graphical keyboard 14. That is, in this example, "5" key 24 included in second keyboard 22 is associated with the numeric character "5," and none of the keys of first graphical keyboard 14 is associated with the numeric character "5".

Each of first graphical keyboard 14 and second graphical keyboard 22 may be displayed by UI device 4 as an ordered set of selectable keys. Keys may represent a single character from a character set (e.g., letters of the English alphabet, numbers), or may represent combinations of characters. One example of a graphical keyboard may include a traditional "QWERTY" keyboard layout. Other examples may contain characters for different languages, different character sets, or different character layouts. As shown in the example of FIG. 1, first graphical keyboard 14 includes a version of the traditional "QWERTY" keyboard layout for the English language providing character keys as well as various keys (e.g., the "123" key) providing other functionality.

In some examples, text display region 13 may include characters or other graphical content that are included in, for example, a text-message, a document, an e-mail message, a web browser, and the like. For instance, text display region 13 may include characters or other graphical content that are selected by a user via gestures performed at UI device 4. In some examples, GUI 12 may include one or more regions, such as password region 26. Other example regions that may be included in GUI 12 include, but are not limited to, URL regions, email address regions, color regions, date regions, datetime regions, datetime-local regions, month regions, number regions, range regions, search regions, telephone number regions, time regions, and week regions. Such regions may each be different regions of GUI 12. In some examples, such regions may be a single region of GUI 12 and may include one or more regions of GUI 12 that are the same as text display region 13.

UI module 6 may cause UI device 4 to display first graphical keyboard 14 and detect gesture input, such as gesture input detected at one or more locations of UI device 4 that display one or more keys of first graphical keyboard 14. Such gesture input may include discrete gestures, such as one or more tap gestures to select individual keys of first graphical keyboard 14. In some examples, UI device 4 may detect one or more continuous gestures, such that UI device 4 detects continuous motion of an input unit (e.g., a finger, pen, stylus) from a first location of UI device 4 to a second location of UI device 4. For example, as illustrated in FIG. 1, UI device 4 may detect continuous motion gesture 28 that includes motion of an input unit (e.g., a finger) from first location 30 to second location 32. UI module 6 may receive an indication of the continuous gesture, such as continuous gesture 28, from UI device 4 and may select one or more keys of first graphical keyboard 14 based at least in part on the indication of the gesture, as is further described below.

Secondary keyboard module 10 may determine, based at least in part on an input context, to display second graphical keyboard 22 comprising a second plurality of keys. The input context may include, for example, an identifier of an input region that is capable of receiving input, such as password region 26. In other examples, secondary keyboard module 10 may receive an indication of an identifier of one or more input regions such as password regions, URL regions, email address regions, color regions, date regions, datetime regions, datetime-local regions, month regions, number regions, range regions, search regions, telephone number regions, time regions, and week regions. The identifier may include an identifier of an active input region of GUI 12 (e.g., a currently selected region, a region including an active cursor, etc.), such as an identifier specified by the Hyper Text Markup Language (HTML) 5 interface.

As an example, secondary keyboard module 10 may receive an indication that password region 26 is an active region of GUI 12. In addition, secondary keyboard module 10 may receive an indication of an identifier of password region 26 identifying password region 26 as a region of GUI 12 configured to receive data specifying a password (e.g., a password that permits access to an application and/or service using computing device 2). In response to receiving the indication of password region 26 as an active region of GUI 12, secondary keyboard module 10 may cause UI module 6 to output, for display at UI device 4, second keyboard 22.

In certain examples, UI module 6 may output second keyboard 22 for display at a portion of GUI 12 that includes one or more displayable regions, such as at text display region 13. In some examples, UI module 6 may output second keyboard 22 as an alpha-blended (e.g., translucent) overlay of one or more of displayable regions. For instance, UI module 6 may output second keyboard 22 as an alpha-blended overlay of text display region 13 or one or more other regions, such as one or more text suggestion regions (not illustrated).

Gesture module 8 may receive an indication of first portion 34 of continuous gesture 28 detected at UI device 4 (e.g., a presence-sensitive input device). As illustrated, first portion 34 includes motion of an input unit (e.g., a finger) from first location 30 corresponding to "P" key 16 to a location of UI device 4 corresponding to "A" key 18 of first graphical keyboard 14. Gesture module 8 may select, based at least in part on the indication of first portion 34 of continuous gesture 28, "A" key 18 of first graphical keyboard 14 as is further described below.

Gesture module 8 may receive an indication of second portion 36 of continuous gesture 28 detected at UI device 4. As illustrated, second portion 36 includes motion of the input unit from the location corresponding to "A" key 18 to a location corresponding to "5" key 24. Gesture module 8 may select, based at least in part on the indication of second portion 36 of continuous gesture 28, "5" key 24 of second graphical keyboard 22. As is further illustrated in FIG. 1, gesture module 8 may continue to one or more portions of continuous gesture 28 and select one or more keys of first graphical keyboard 14 and/or second graphical keyboard 22, such as "S" key 20 of first graphical keyboard 14.

Gesture module 8 may determine a candidate character string including one or more characters associated with selected keys. The candidate character string may include one or more characters associated with keys of first graphical keyboard 14 and one or more characters associated with second graphical keyboard 22. For example, gesture module 8 may determine candidate character string 38. As illustrated, candidate character string 38 may include "A" character 40 corresponding to "A" key 18 of first graphical keyboard 14 and "5" character 42 corresponding to "5" key 24 of second graphical keyboard 22.

In this way, computing device 2 may improve the ease with which a user may provide gesture input to select one or more characters of text using a graphical keyboard. According to techniques described herein, a user may provide continuous gesture input to select one or more alphabetic characters included in a first graphical keyboard and one or non-alphabetic characters included in a second graphical keyboard without requiring discrete gesture inputs to change modes of the graphical keyboard and to initiate display of selectable keys corresponding to non-alphabetic characters. As such, the techniques may potentially increase the rate at which a user may provide gesture input to select text using the computing device, including combinations of alphabetic and non-alphabetic text, thereby potentially increasing usability of the computing device.

Figure 2:
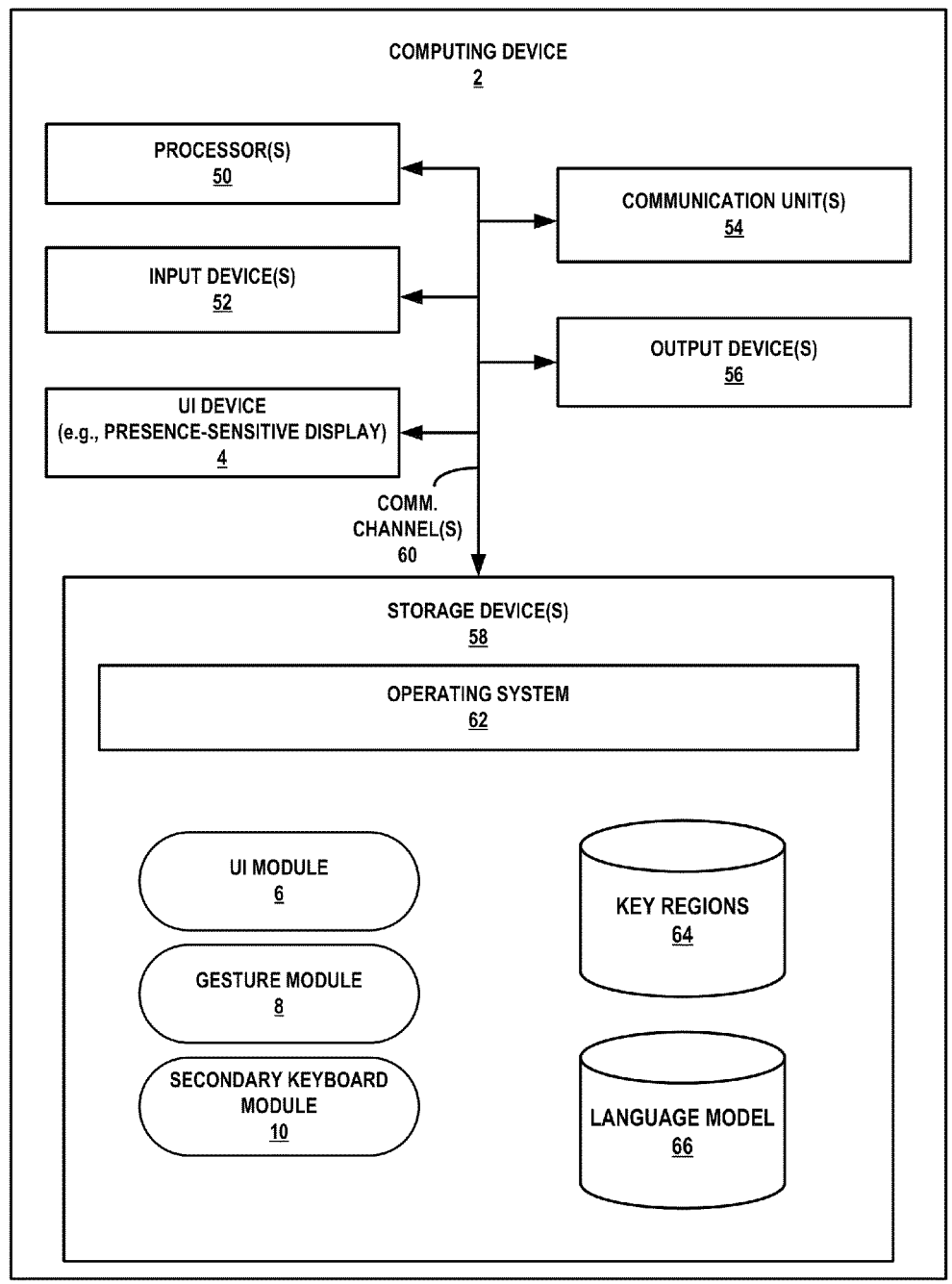
FIG. 2 is a block diagram illustrating further details of one example of the computing device shown in FIG. 1, in accordance with one or more aspects of this disclosure.

FIG. 2 is a block diagram illustrating further details of one example of the computing device shown in FIG. 1, in accordance with one or more aspects of this disclosure. FIG. 2 illustrates only one particular example of computing device 2, and many other examples of computing device 2 may be used in other instances.

As shown in the specific example of FIG. 2, computing device 2 includes one or more processors 50, one or more input devices 52, UI device 4, one or more communication units 54, one or more output devices 56, and one or more storage devices 58. As illustrated, computing device 2 may further include UI module 6, gesture module 8, secondary keyboard module 10, and operating system 62 that are executable by computing device 2 (e.g., by one or more processors 50). Computing device 2 may further include key regions 64 and language model 66.

Each of components 4, 50, 52, 54, 56, and 58 may be interconnected (physically, communicatively, and/or operatively) for inter-component communications. In some examples, communication channels 60 may include a system bus, a network connection, an inter-process communication data structure, or any other method for communicating data. As one example in FIG. 2, components 4, 50, 52, 54, 56, and 58 may be coupled by one or more communication channels 60. UI module 6, gesture module 8, and secondary module 10 may also communicate information with one another as well as with other components of computing device 2, such as key regions 64 and language model 66.

Processors 50, in one example, are configured to implement functionality and/or process instructions for execution within computing device 2. For example, processors 50 may be capable of processing instructions stored in storage device 58. Examples of processors 50 may include any one or more of a microprocessor, a controller, a digital signal processor (DSP), an application specific integrated circuit (ASIC), a field-programmable gate array (FPGA), or equivalent discrete or integrated logic circuitry.

Storage device 58 may be configured to store information within computing device 2 during operation. Storage device 58, in some examples, is described as a computer-readable storage medium. In some examples, storage device 58 is a temporary memory, meaning that a primary purpose of storage device 58 is not long-term storage. Storage device 58, in some examples, is described as a volatile memory, meaning that storage device 58 does not maintain stored contents when the computer is turned off. Examples of volatile memories include random access memories (RAM), dynamic random access memories (DRAM), static random access memories (SRAM), and other forms of volatile memories known in the art. In some examples, storage device 58 is used to store program instructions for execution by processors 50. Storage device 58, in one example, is used by software or applications running on computing device 2 (e.g., secondary keyboard module 10) to temporarily store information during program execution.

Storage device 58, in some examples, also includes one or more computer-readable storage media. Storage devices 58 may be configured to store larger amounts of information than volatile memory. Storage devices 58 may further be configured for long-term storage of information. In some examples, storage devices 58 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 2, in some examples, also includes one or more communication units 54. Computing device 2, in one example, utilizes communication unit 54 to communicate with external devices via one or more networks, such as one or more wireless networks. Communication unit 54 may be a network interface card, such as an Ethernet card, an optical transceiver, a radio frequency transceiver, or any other type of device that can send and receive information. Other examples of such network interfaces may include Bluetooth, 3G and WiFi radios computing devices as well as Universal Serial Bus (USB). In some examples, computing device 2 utilizes communication unit 54 to wirelessly communicate with an external device such as a server.

Computing device 2, in one example, also includes one or more input devices 52. Input device 52, in some examples, is configured to receive input from a user through tactile, audio, or video feedback. Examples of input device 52 include a presence-sensitive display, presence-sensitive input device, a mouse, a keyboard, a voice responsive system, video camera, microphone or any other type of device for detecting a command from a user. In some examples, a presence-sensitive display includes a touch-sensitive screen.

One or more output devices 56 may also be included in computing device 2. Output device 56, in some examples, is configured to provide output to a user using tactile, audio, or video stimuli. Output device 56, in one example, includes a presence-sensitive display, a sound card, a video graphics adapter card, or any other type of device for converting a signal into an appropriate form understandable to humans or machines. Additional examples of output device 56 include a speaker, a cathode ray tube (CRT) monitor, a liquid crystal display (LCD), or any other type of device that can generate intelligible output to a user.

In some examples, UI device 4 may include functionality of input device 52 and/or output device 56. In one example, UI device 4 may be a touch-sensitive screen. In the example of FIG. 2, UI device 4 may be a presence-sensitive display. In some examples, a presence sensitive display may detect an object, such as an input unit (e.g., user's finger, pen, stylus, etc.) at and/or near the screen of the presence-sensitive display. As one example range, a presence-sensitive display may detect an input unit that is within 2 inches or less of the physical screen of the presence-sensitive display. The presence-sensitive display may determine one or more locations (e.g., (x,y) coordinates) of the presence-sensitive display at which the input unit was detected. In another example range, a presence-sensitive display may detect an object 6 inches or less from the physical screen of the presence-sensitive display and other exemplary ranges are also possible. The presence-sensitive display may determine the location of the display selected by an input unit using capacitive, inductive, and/or optical recognition techniques. In some examples, the presence sensitive display provides output to a user using tactile, audio, or video stimuli as described with respect to output device 56.

Computing device 2 may include operating system 62. Operating system 62, in some examples, controls the operation of components of computing device 2. For example, operating system 62, in one example, facilitates the communication of UI module 6, gesture module 8, and/or secondary keyboard module 10 with processors 50, communication unit 54, storage device 58, input device 52, and output device 56. UI module 6, gesture module 8, and secondary keyboard module 10 may each include program instructions and/or data that are executable by computing device 2. As one example, secondary keyboard module 10 may include instructions that cause computing device 2 to perform one or more of the operations and actions described in the present disclosure.

Computing device 2 may include language model 66. Language model 66 may include a lexicon. In some examples, a lexicon may include a listing of words and may include additional information about the listed words. A lexicon may be represented by one or more data structures, such as by one or more of an array, a list, a tree, or other data structures. For example, language model 66 may include a lexicon stored in a trie data structure. In some examples, language model 66 may be a default dictionary installed on computing device 2. In certain examples, language model 66 may include a group of predefined phrases installed on computing device 2. In other examples, language model 66 may include multiple sources of lexicons, which may be stored at computing device 2 or stored at one or more remote computing devices that are accessible to computing device 2 via one or more communication channels. In some examples, language model 66 may be implemented in the firmware of computing device 2.

Language model 66 may include language model frequency information such as n-gram language models. An n-gram language model may provide a probability distribution for an item $x_i$ (letter, word, punctuation character or other delimiter) in a contiguous sequence of items based on the previous items in the sequence (i.e., $P(x_i|x_{i-(n-1)}, \ldots, x_{i-1})$). For instance, a bigram language model (an n-gram model where n=2), may provide a probability that the letter "i" follows the sequence of letters "th". As another example, a bigram language model may provide a probability that the word "than" follows the word "better". In some examples, language model 66 includes a lexicon trie with integrated language model frequency information. For instance, each node of the lexicon trie may include a representation of a letter and a probability value.

Techniques of the present disclosure may improve the speed with which a user can enter text into a computing device. Using techniques of this disclosure, a computing device may determine, based at least in part on an input context, to output a second graphical keyboard for contemporaneous display with a first graphical keyboard. A character associated with at least one key of the second keyboard may be different than each character associated with each key of the first keyboard. For instance, the second keyboard may include one or more non-alphabetic keys associated with non-alphabetic characters (e.g., number and/or symbol characters) that are not included in the first graphical keyboard. Accordingly, a computing device implementing techniques of this disclosure may enable a user to provide continuous gesture input to select one or more keys of the first graphical keyboard and one or more keys of the second graphical keyboard without requiring separate, discrete gesture input to change modes of the first graphical keyboard to display the plurality of keys included in the second keyboard.

UI module 6 may output, for display, a graphical user interface including a first graphical keyboard including a first plurality of keys. For example, UI module 6 may output, for display at UI device 4, first graphical keyboard 14 including "P" key 16, "A" key 18, and "S" key 20. Secondary keyboard module 10 may determine, based at least in part on an input context, to display a second graphical keyboard including a second plurality of keys. For instance, secondary keyboard module 10 may determine, based on an identifier of password region 26 (e.g., an active input region of GUI 12) as a region of GUI 12 configured to receive password information, to output second graphical keyboard 22. Secondary keyboard module 10 may output, for contemporaneous display with first graphical keyboard 14, second graphical keyboard 22. A character associated with at least one key from the second plurality of keys may be different than each character associated with each key from the first plurality of keys. For instance, a "5" character associated with "5" key 24 of second keyboard 22 is different than each character associated with each key of first graphical keyboard 14.

Gesture module 8 may receive an indication of a first portion of a continuous gesture detected at a presence-sensitive input device. As an example, gesture module 8 may receive an indication of first portion 34 of continuous gesture 28 detected at UI device 4 (e.g., a presence-sensitive input device). Gesture module 8 may select, based at least in part on the first portion of the continuous gesture, a first key from the first plurality of keys of the first graphical keyboard as a first selected key. For instance, gesture module 8 may select, based at least in part on first portion 34 of continuous gesture 28, "A" key 18 of first graphical keyboard 14.

As an example, a user may perform a gesture to select a group of keys of one or more of first graphical keyboard 14 and second graphical keyboard 22. In response to the user performing the gesture, UI device 4 may detect a gesture path, such as a gesture path defined by continuous gesture 28 of FIG. 1, which may be received by UI module 6 as gesture path data. Gesture module 8 may receive the gesture path data from UI module 6. In some examples, UI module 6 incrementally sends the gesture path data to gesture module 8 as the gesture path defined by continuous gesture 28 is detected by UI device 4.

Gesture module 8 may determine, based on a plurality of features associated with the gesture path data, one or more alignment points traversed by the gesture. In the example of FIG. 1, gesture module 8 may determine that a first alignment point is located at the start of the gesture path defined by continuous gesture 28. In some examples, gesture module 8 may determine the curvature of the path at a point along the gesture path. In such examples, gesture module 8 may determine that the point is more likely to be an alignment point where there is a high curvature (where the gesture path changes direction abruptly at the point). In other examples, gesture module 8 may determine a mid-segment curvature (the maximum curvature of the gesture path between two points along the gesture). In another example, gesture module 8 may determine that a point is less likely to be the next alignment point where there is a high mid-segment curvature. In some examples, gesture module 8 may determine that a point is an alignment point based on the speed at which the gesture path was detected. In some examples, a slower rate of detection indicates that the point is an alignment point. In some examples, a high mid-segment curvature may indicate that there were corners between a first point and a second point, suggesting that the second point is less likely to be the next alignment point (i.e., a point was missed in-between).

In some examples, an alignment point may be based on the maximum distance between points of a gesture segment between two or more points and an ideal line from a first key to a second key. An ideal line may be, e.g., a shortest distance path from the first key to the second key. For a better alignment the maximum distance may be small, signifying that the gesture segment does not deviate from the ideal line.

For each alignment point, gesture module 8 may determine respective cost values for each of at least two keys of the plurality of keys included in one or more of first graphical keyboard 14 and second graphical keyboard 22. Each of the respective cost values may represent a probability that the alignment point indicates a key of the plurality of keys. In some examples, gesture module 8 determines the respective cost values by comparing respective physical cost values with respective lexical cost values, as further described below.

Gesture module 8 may determine respective physical cost values for each of at least two keys of the plurality of keys. Each of the respective physical cost values may represent a probability that physical features of an alignment point indicate physical features of a key of the plurality of keys. For instance, gesture module 8 may determine the respective physical cost values by evaluating the Euclidian distance between an alignment point and a keyboard position of a key.

Physical features of the plurality of keys may be included in key regions 64. For example, key regions 64 may include, for each of the first plurality of keys of first graphical keyboard 14 and the second plurality of keys of second graphical keyboard 22, a set of coordinates that correspond to a location and/or area of first graphical keyboard 14 and/or second graphical keyboard 22 where each key is displayed. In the example of FIG. 1, gesture module 8 may determine a first physical cost value based on the Euclidian distance between the first alignment point and "A" key 18. In some examples, gesture module 8 may determine the physical cost values by comparing the Euclidian distance between a first alignment point and a second alignment point with the Euclidian distance between a first letter indicated by the first alignment point and a second letter which may be represented by the second alignment point. Gesture module 8 may determine that the cost value of the second letter is inversely proportional to the difference between the distances (i.e., that the second letter is more probable where the distances are more similar). For instance, a smaller distance may suggest a better alignment.

Gesture module 8 may also determine the respective cost values by determining respective lexical cost values for each of at least two keys of the plurality of keys. Each of the respective lexical cost values may represent a probability that a letter represented by a key of the plurality of keys is included in a candidate word. The lexical cost values may be based on language model 66. For instance, the lexical cost values may represent the likelihood that a given letter is selected based on probable words included in language model 66.

In certain examples, gesture module 8 may determine the respective cost values by combining respective physical cost values and respective lexical cost values, such as by summing the respective physical cost values and respective lexical cost values to determine a combined cost value. For example, gesture module 8 may select a key of one or more of first graphical keyboard 14 and second graphical keyboard 22 in response to determining that the key is associated with a lowest combined cost value.

In some examples, gesture module 8 may determine the respective cost values based on respective physical cost values but not respective lexical cost values. For instance, certain character strings, such as those character strings including non-alphabetic characters (e.g., number and/or symbol characters), may not be represented in a lexicon included in language model 66. Accordingly, character strings including non-alphabetic characters, e.g., passwords including non-alphabetic characters, dates, times, etc., may be associated with a high lexical cost value (e.g., indicating a low probability of the character string), thereby reducing the likelihood that keys associated with the character string will be determined as selected keys based on the gesture path data. As such, in certain examples, such as when an input context (e.g., an identifier of an input region capable of receiving input, such as a password region, a date region, a time region, and the like) indicates that non-alphabetic characters are likely to be selected, gesture module 8 may determine the respective cost values based on respective physical cost values but not based on respective lexical cost values. In some examples, gesture module 8 may determine the respective cost values and an associated candidate character string without comparing without comparing the candidate character string to a language model (e.g., language model 66) that indicates a probability that the candidate character string represents a word included in a lexicon.

In certain examples, gesture module 8 may output, based at least in part on the input context, an indication of a probability of selection of at least one key from one or more of the first plurality of keys of the first graphical keyboard (e.g., first graphical keyboard 14) and the second plurality of keys of the second graphical keyboard (e.g., second graphical keyboard 22). For instance, gesture module 8 may output a heat map for display at one or more of first graphical keyboard 14 and second graphical keyboard 22. The heat map may indicate the probability of selection of the at least one key, such as by outputting a density of a number of dots displayed at a region corresponding to the at least one key in proportion to the probability of selection of the at least one key (e.g., a higher density indicating a higher probability of selection), outputting a color of a region corresponding to the at least one key in proportion to the probability of selection of the at least one key (e.g., a color scale from a color green indicating a low probability of selection to a color red indicating a high probability of selection). In this way, gesture module 8 may output an indication of a probability of selection of the at least one key to compensate for a decrease in accuracy of predictions due to a lack of information received from language model 66.

Gesture module 8 may receive an indication of a second portion of the continuous gesture detected at the presence-sensitive input device. For example, gesture module 8 may receive an indication of second portion 36 of continuous gesture 28 detected at UI device 4 (e.g., a presence-sensitive input device). Gesture module 8 may select, based at least in part on the second portion of the continuous gesture, a second key from the second plurality of keys of the second graphical keyboard as a second selected key. For instance, gesture module 8 may select, based at least in part on one or more cost values (e.g., physical cost values) associated with gesture path data defined by second portion 36 of continuous gesture 28, "5" key 24 of second keyboard 22.

In this way, techniques of this disclosure may enable a user to provide continuous gesture input to select one or more keys of a first graphical keyboard, such as a first graphical keyboard including keys associated with alphabetic characters, and one or more keys of a second graphical keyboard, such as a second graphical keyboard including keys associated with one or more characters not associated with any of the keys of the first graphical keyboard. Accordingly, a computing device implementing techniques of this disclosure may potentially increase the rate at which a user may input text, such as text including a combination of alphabetic and non-alphabetic characters. In this way, the techniques may improve usability of the computing device.

Figure 3:
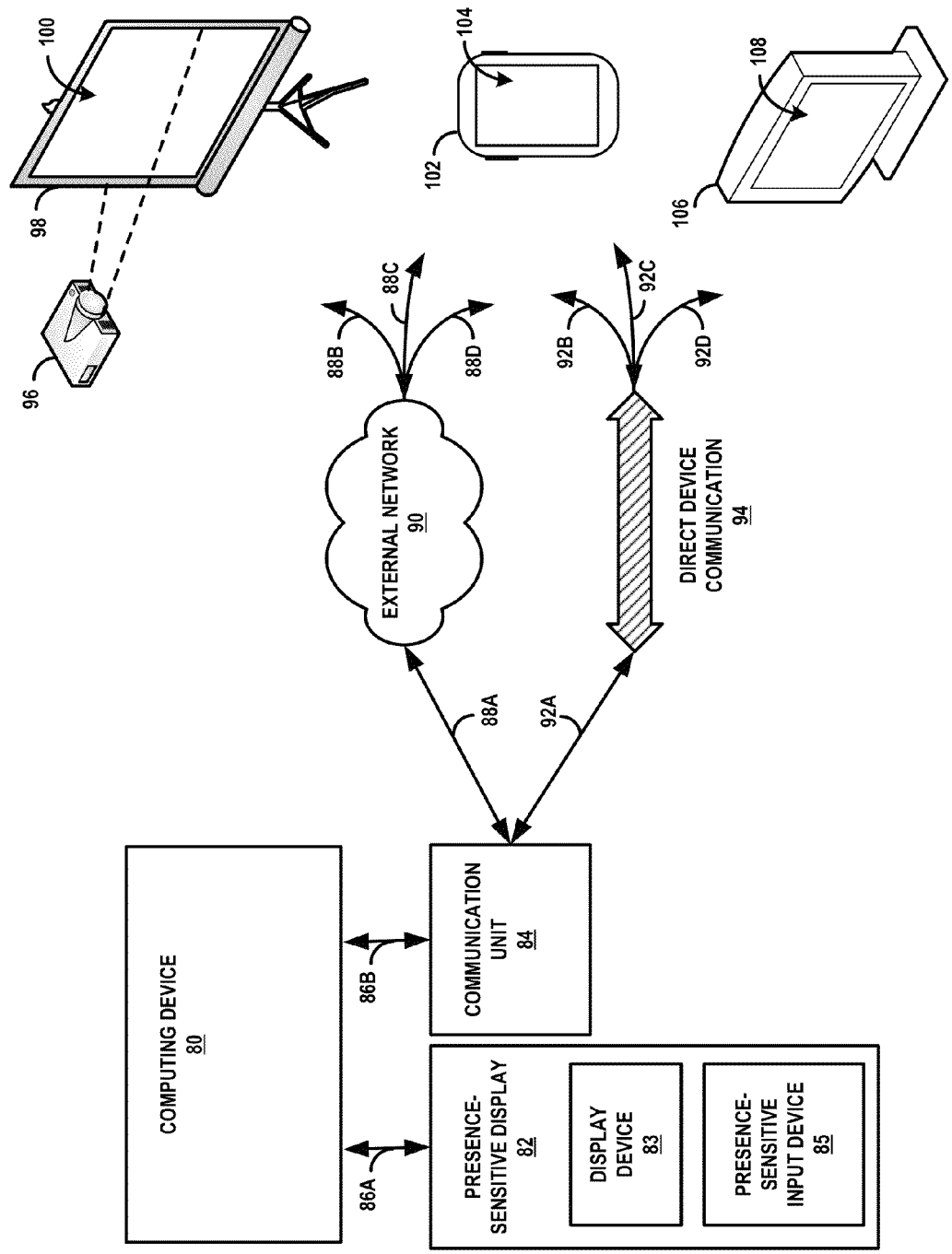
FIG. 3 is a block diagram illustrating an example computing device that outputs graphical content for display at a remote device, in accordance with one or more aspects of this disclosure.

FIG. 3 is a block diagram illustrating an example computing device that outputs graphical content for display at a remote device, in accordance with one or more aspects of this disclosure. Graphical content, generally, may include any visual information that may be output for display, such as text, images, a group of moving images, etc. The example shown in FIG. 3 includes a computing device 80, presence-sensitive display 82, communication unit 84, projector 96, projector screen 98, tablet device 102, and visual display device 106. Although shown for purposes of example in FIGS. 1 and 2 as a stand-alone computing device 2, a computing device may, generally, be any component or system that includes a processor or other suitable computing environment for executing software instructions and, for example, need not include a presence-sensitive display.

As shown in the example of FIG. 3, computing device 80 may be a processor that includes functionality as described with respect to processor 50 in FIG. 2. In such examples, computing device 80 may be operatively coupled to presence-sensitive display 82 by a communication channel 86A, which may be a system bus or other suitable connection. Computing device 80 may also be operatively coupled to communication unit 84, further described below, by a communication channel 86B, which may also be a system bus or other suitable connection. Although shown separately as an example in FIG. 3, computing device 80 may be operatively coupled to presence-sensitive display 82 and I/O devices 84 by any number of one or more communication channels.

In other examples, such as illustrated previously in FIGS. 1-2, computing device 80 may refer to a portable or mobile device such as mobile phones (including smart phones), laptop computers, etc. In some examples, computing device 80 may be a desktop computers, tablet computers, smart television platforms, cameras, personal digital assistants (PDAs), servers, mainframes, etc.

Presence-sensitive display 82, like UI device 4 as shown in FIG. 1, may include display device 83 and presence-sensitive input device 85. Display device 83 may, for example, receive data from computing device 80 and display the graphical content. In some examples, presence-sensitive input device 85 may determine one or more user inputs (e.g., continuous gestures, multi-touch gestures, single-touch gestures, etc.) at presence-sensitive display 82 using capacitive, inductive, and/or optical recognition techniques and send indications of such user input to computing device 80 using communication channel 86A. In some examples, presence-sensitive input device 85 may be physically positioned on top of display device 83 such that, when a user positions an input unit over a graphical element displayed by display device 83, the location at which presence-sensitive input device 85 corresponds to the location of display device 83 at which the graphical element is displayed.

As shown in FIG. 3, computing device 80 may also include and/or be operatively coupled with communication unit 84. Communication unit 84 may include functionality of communication unit 54 as described in FIG. 2. Examples of communication unit 84 may include a network interface card, an Ethernet card, an optical transceiver, a radio frequency transceiver, or any other type of device that can send and receive information. Other examples of such communication units may include Bluetooth, 3G, and WiFi radios, Universal Serial Bus (USB) interfaces, etc. Computing device 80 may also include and/or be operatively coupled with one or more other devices, e.g., input devices, output devices, memory, storage devices, etc. that are not shown in FIG. 3 for purposes of brevity and illustration.

FIG. 3 also illustrates a projector 96 and projector screen 98. Other such examples of projection devices may include electronic whiteboards, holographic display devices, and any other suitable devices for displaying graphical content. Projector 96 and project screen 98 may include one or more communication units that enable the respective devices to communicate with computing device 80. In some examples, the one or more communication units may enable communication between projector 96 and projector screen 98. Projector 96 may receive data from computing device 80 that includes graphical content. Projector 96, in response to receiving the data, may project the graphical content onto projector screen 98. In some examples, projector 96 may determine one or more user inputs (e.g., continuous gestures, multi-touch gestures, single-touch gestures) at projector screen using optical recognition or other suitable techniques and send indications of such user input using one or more communication units to computing device 80.

Projector screen 98, in some examples, may include a presence-sensitive display 100. Presence-sensitive display 100 may include a subset of functionality or all of the functionality of UI device 4 as described in this disclosure. In some examples, presence-sensitive display 100 may include additional functionality. Projector screen 98 (e.g., an electronic whiteboard) may receive data from computing device 80 and display the graphical content. In some examples, presence-sensitive display 100 may determine one or more user inputs (e.g., continuous gestures, multi-touch gestures, single-touch gestures, etc.) at projector screen 98 using capacitive, inductive, and/or optical recognition techniques and send indications of such user input using one or more communication units to computing device 80.

FIG. 3 also illustrates tablet device 102 and visual display device 106. Tablet device 102 and visual display device 106 may each include computing and connectivity capabilities. Examples of tablet device 102 may include e-reader devices, convertible notebook devices, hybrid slate devices, etc. Examples of visual display device 106 may include televisions, computer monitors, etc. As shown in FIG. 3, tablet device 102 may include a presence-sensitive display 104. Visual display device 106 may include a presence-sensitive display 108. Presence-sensitive displays 104, 108 may include a subset of functionality or all of the functionality of UI device 4 as described in this disclosure. In some examples, presence-sensitive displays 104, 108 may include additional functionality. In any case, presence-sensitive display 108, for example, may receive data from computing device 80 and display the graphical content. In some examples, presence-sensitive display 108 may determine one or more user inputs (e.g., continuous gestures, multi-touch gestures, single-touch gestures, etc.) at projector screen using capacitive, inductive, and/or optical recognition techniques and send indications of such user input using one or more communication units to computing device 80.

As described above, in some examples, computing device 80 may output graphical content for display at presence-sensitive display 82 that is coupled to computing device 80 by a system bus or other suitable communication channel. Computing device 80 may also output graphical content for display at one or more remote devices, such as projector 96, projector screen 98, tablet device 102, and visual display device 106. For instance, computing device 80 may execute one or more instructions to generate and/or modify graphical content in accordance with techniques of the present disclosure. Computing device 80 may output the data that includes the graphical content to a communication unit of computing device 80, such as communication unit 84. Communication unit 84 may send the data to one or more of the remote devices, such as projector 96, projector screen 98, tablet device 102, and/or visual display device 106. In this way, processor 102 may output the graphical content for display at one or more of the remote devices. In some examples, one or more of the remote devices may output the graphical content at a presence-sensitive display that is included in and/or operatively coupled to the respective remote devices.

In some examples, computing device 80 may not output graphical content at presence-sensitive display 82 that is operatively coupled to computing device 80. In other examples, computing device 80 may output graphical content for display at both a presence-sensitive display 82 that is coupled to computing device 80 by communication channel 86A, and at one or more remote devices. In such examples, the graphical content may be displayed substantially contemporaneously at each respective device. For instance, some delay may be introduced by the communication latency to send the data that includes the graphical content to the remote device. In some examples, graphical content generated by computing device 80 and output for display at presence-sensitive display 82 may be different than graphical content display output for display at one or more remote devices.

Computing device 80 may send and receive data using any suitable communication techniques. For example, computing device 80 may be operatively coupled to external network 90 using network link 88A. Each of the remote devices illustrated in FIG. 3 may be operatively coupled to network external network 90 by one of respective network links 88B, 88C, and 88D. External network 90 may include network hubs, network switches, network routers, etc., that are operatively inter-coupled thereby providing for the exchange of information between computing device 80 and the remote devices illustrated in FIG. 3. In some examples, network links 88A-88D may be Ethernet, ATM or other network connections. Such connections may be wireless and/or wired connections.

In some examples, computing device 80 may be operatively coupled to one or more of the remote devices included in FIG. 3 using direct device communication 94. Direct device communication 94 may include communications through which computing device 80 sends and receives data directly with a remote device, using wired or wireless communication. That is, in some examples of direct device communication 94, data sent by computing device 80 may not be forwarded by one or more additional devices before being received at the remote device, and vice-versa. Examples of direct device communication 94 may include Bluetooth, Near-Field Communication, Universal Serial Bus, WiFi, infrared, etc. One or more of the remote devices illustrated in FIG. 3 may be operatively coupled with computing device 80 by communication links 92A-92D. In some examples, communication links 88A-88D may be connections using Bluetooth, Near-Field Communication, Universal Serial Bus, infrared, etc. Such connections may be wireless and/or wired connections.

In accordance with techniques of the disclosure, computing device 80 may be operatively coupled to visual display device 106 using external network 90. Computing device 80 may output a graphical user interface including, for example, a first graphical keyboard including a first plurality of keys for display at presence-sensitive display 108. For instance, computing device 80 may send data that includes a representation of the graphical user interface to communication unit 84. Communication unit 84 may send the data that includes the representation of the graphical user interface to visual display device 106 using external network 90. Visual display device 106, in response to receiving the data using external network 90, may cause presence-sensitive display 108 to output the graphical user interface. Computing device 80 may determine, based at least in part on an input context, to display a second graphical keyboard comprising a second plurality of keys. Computing device 80 may output, for contemporaneous display with the first graphical keyboard, the second graphical keyboard. For example, computing device 80 may send data that includes a representation of the second graphical keyboard to communication unit 84, which may send the data to visual display device 106 using external network 90. Visual display device 106, in response to receiving the data, may cause presence-sensitive display 108 to display the second graphical keyboard contemporaneously with the first graphical keyboard.

In response to a user performing a continuous gesture at presence-sensitive display 108 to select one or more keys of the first graphical keyboard and the second graphical keyboard, visual display device 106 may send an indication of the gesture input to computing device 80 using external network 90. Communication unit 84 may receive the indication of the gesture input, and send the indication to computing device 80.

Computing device 80 may select, based at least in part on an indication of a first portion of the gesture input, a first key from the first plurality of keys of the first graphical keyboard as a first selected key. Computing device 80 may select, based at least in part on an indication of a second portion of the gesture input, a second key from the second plurality of keys of the second graphical keyboard as a second selected key. In some examples, computing device 80 may determine a candidate character string that includes at least one character associated with the first selected key and at least one character associated with the second selected key. Computing device 80 may, in certain examples, output the candidate character string for display at visual display device 106. For instance, computing device 80 may send data that includes the candidate character string to communication unit 84, which in turn sends the data to visual display device 106 using external network 90. Upon receiving the data, visual display device 106 may cause presence-sensitive display 108 to display the candidate character string within the graphical user interface. In this way, processor 102 may output the candidate character string for display at presence-sensitive screen 108, in accordance with techniques of this disclosure.

Figure 4A:
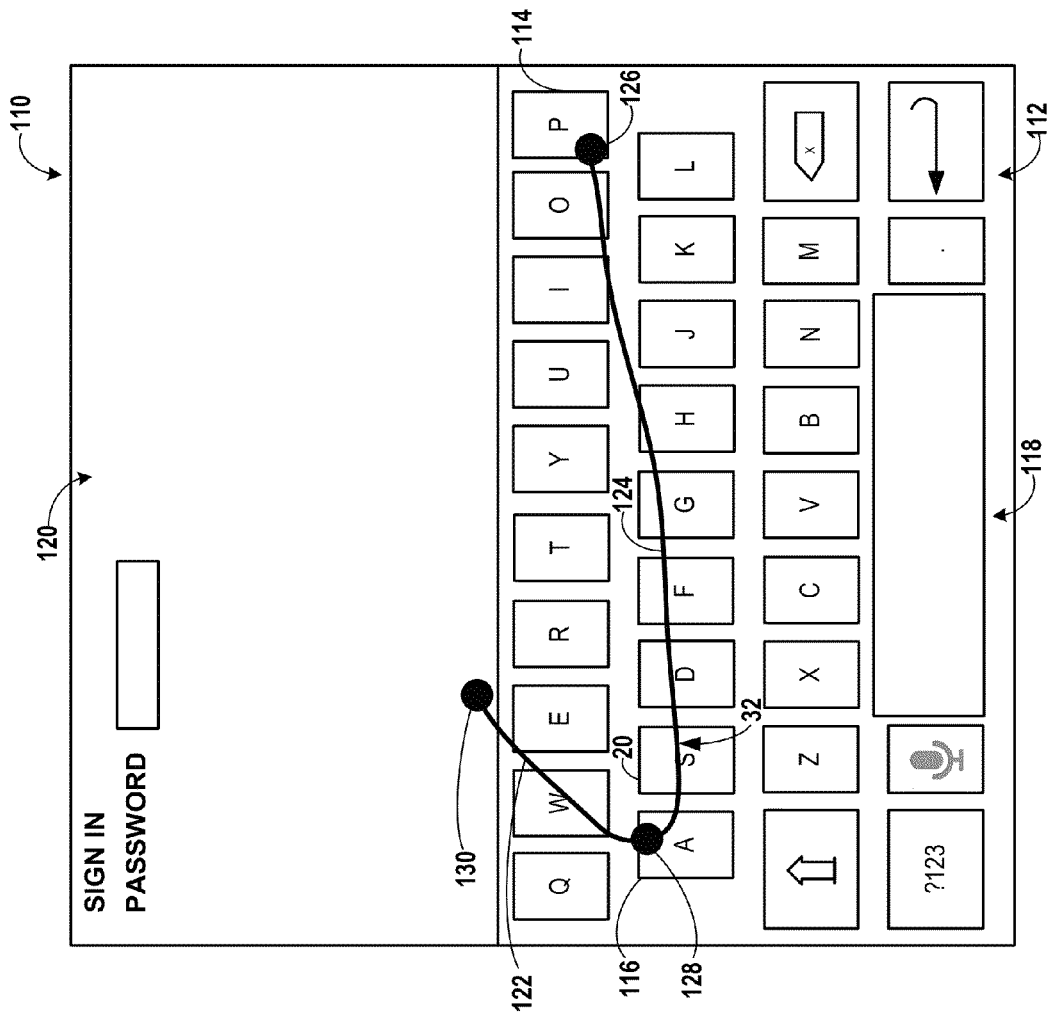
FIGS. 4A-4B are block diagrams illustrating an example computing device that may be used to output a second graphical keyboard for contemporaneous display with a first graphical keyboard, in accordance with one or more aspects of this disclosure.
Figure 4B:
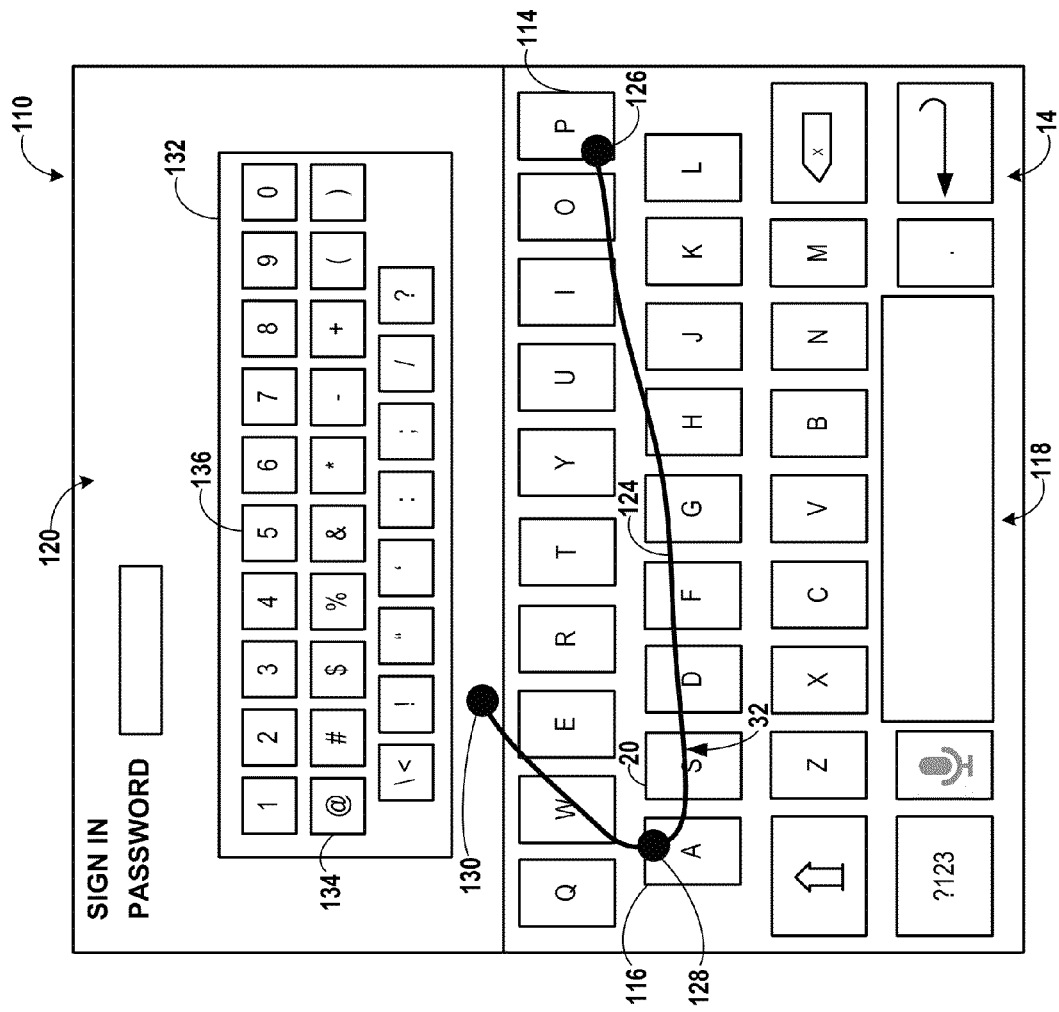

FIGS. 4A-4B are block diagrams illustrating an example computing device that may be used to output a second graphical keyboard for contemporaneous display with a first graphical keyboard, in accordance with one or more aspects of this disclosure. FIG. 4A illustrates an example of a computing device outputting, for display, a graphical user interface including a first graphical keyboard and receiving an indication of gesture input. FIG. 4B illustrates an example of the computing device of FIG. 4A outputting a second graphical keyboard for contemporaneous display with the first graphical keyboard. That is, when considered together, FIGS. 4A-4B illustrate an example of a computing device outputting, for display, a graphical user interface including a first graphical keyboard, receiving an indication of gesture input, and in response to receiving the indication of the gesture input, outputting a second graphical keyboard for contemporaneous display with the first graphical keyboard within the graphical user interface. For purposes of illustration, the examples of FIGS. 4A-4B are described within the context of computing device 2 of FIGS. 1-2.

As illustrated in FIG. 4A, UI module 6 may output GUI 110 including first graphical keyboard 112. As illustrated, first graphical keyboard 112 may include a first plurality of keys, such as "P" key 112 and "A" key 114. GUI 110 may include bottom region 118 and top region 120. Bottom region 118 and top region 120 may be considered bottom and top regions with respect to an orientation of GUI 110, such as an orientation of GUI 110 that a user may read text displayed within GUI 110 while viewing GUI 110. That is, bottom region 118 may be considered a bottom region of GUI 110 with respect to an orientation of text presented at GUI 110. Similarly, top region 120 may be considered a top region of GUI 110 with respect to an orientation of text presented at GUI 110, such that a user viewing GUI 110 would naturally read text displayed within GUI 110 left to right and from top region 120 to bottom region 118. Bottom region 118 and top region 120 may be any region of GUI 110 such that bottom region 118 is below top region 120 with respect to the orientation of GUI 110.

Gesture module 8 may receive an indication of portion 122 of continuous gesture 124. As illustrated, continuous gesture 124 may include motion of an input unit from first location 126 to second location 128 to third location 130. Portion 122 may include motion of the input unit from second location 128 to third location 130. Gesture module 8 may determine that portion 122 of continuous gesture 124 includes motion of the input unit from second location 128 corresponding to a location of GUI 110 that is associated with first graphical keyboard 112 (e.g., a location within a region of GUI 110 that includes first graphical keyboard 112) to second location 130 corresponding to a location of GUI 110 that is not associated with first graphical keyboard 112 (e.g., a location within a region of GUI 110 that does not include first graphical keyboard 112) in a direction from bottom region 118 to top region 120. In response, gesture module 8 may cause secondary keyboard module 10 to output, for contemporaneous display with first graphical keyboard 112, a second graphical keyboard including a second plurality of keys. In this way, secondary keyboard module 10 may output the second graphical keyboard in response to receiving gesture input including motion that extends outside the region of GUI 110 that includes first graphical keyboard 112 in a direction from a bottom region of GUI 110 to a top region of GUI 110 (e.g., a gesture that extends "off the top" of the first graphical keyboard).

As illustrated in FIG. 4B, secondary keyboard module 10 may output, for contemporaneous display with first graphical keyboard 112, second graphical keyboard 132. That is, secondary keyboard module 10 may cause UI device 4 to display second graphical keyboard 132 within GUI 110 while UI device 4 displays first graphical keyboard 112 within GUI 110. As illustrated, second graphical keyboard 132 may include a second plurality of keys, such as "@" key 134 and "5" key 136. In this way, secondary keyboard module 10 may output second graphical keyboard 132 for contemporaneous display with first graphical keyboard 112 such that at least one character associated with at least one key of second graphical keyboard 132 is different than each character associated with each key of first graphical keyboard 112.

Figure 5A:
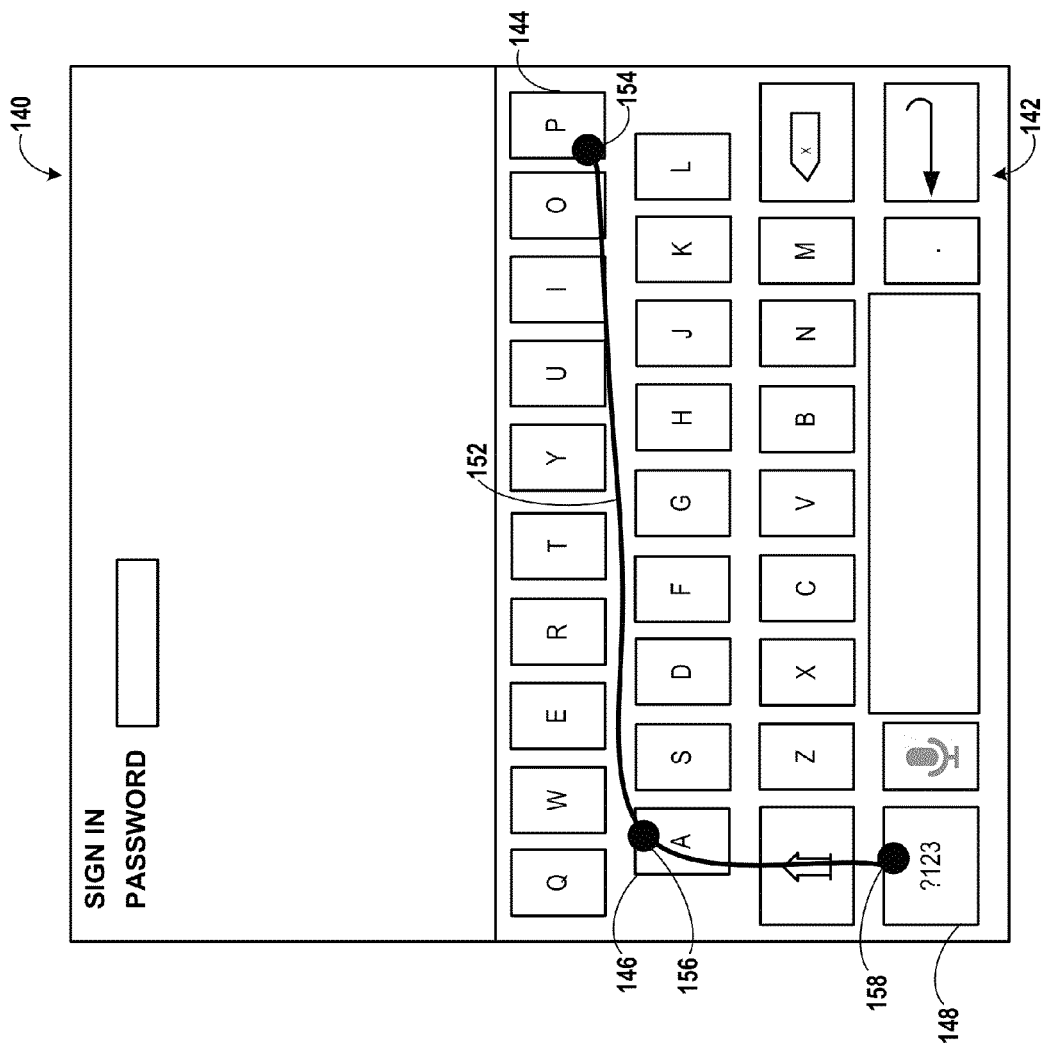
FIGS. 5A-5B are block diagrams illustrating an example computing device that may be used to output a second graphical keyboard for contemporaneous display with a first graphical keyboard, in accordance with one or more aspects of this disclosure.
Figure 5B:
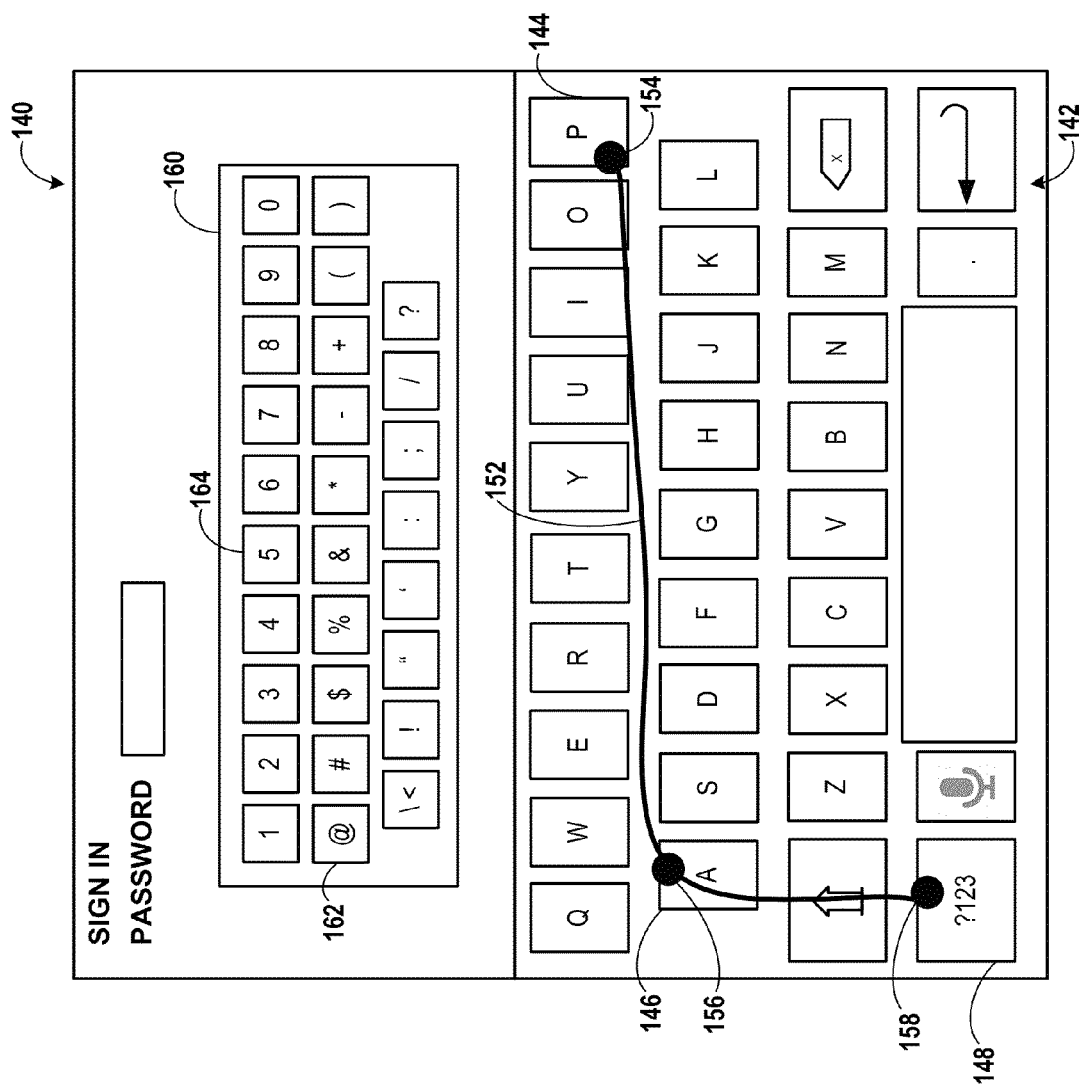

FIGS. 5A-5B are block diagrams illustrating an example computing device that may be used to output a second graphical keyboard for contemporaneous display with a first graphical keyboard, in accordance with one or more aspects of this disclosure. FIG. 5A illustrates an example of a computing device outputting, for display, a graphical user interface including a first graphical keyboard and receiving an indication of gesture input. FIG. 5B illustrates an example of the computing device of FIG. 5A outputting a second graphical keyboard for contemporaneous display with the first graphical keyboard. That is, when considered together, FIGS. 5A-5B illustrate an example of a computing device outputting, for display, a graphical user interface including a first graphical keyboard, receiving an indication of gesture input, and in response to receiving the indication of the gesture input, outputting a second graphical keyboard for contemporaneous display with the first graphical keyboard within the graphical user interface. For purposes of illustration, the examples of FIGS. 5A-5B are described within the context of computing device 2 of FIGS. 1-2.

As illustrated in FIG. 5A, UI module 6 may output GUI 140 including first graphical keyboard 142. As illustrated, first graphical keyboard 142 may include a first plurality of keys, such as "P" key 144, "A" key 146, and "?123" key 148. Gesture module 8 may receive an indication portion 150 of continuous gesture 152. As illustrated, continuous gesture 152 may include motion of an input unit from first location 154 to second location 156 to third location 158. Portion 150 may include motion of the input unit from second location 156 to third location 158.

Gesture module 8 may select, based at least in part on portion 150 of continuous gesture 152, "?123" key 148 in accordance with techniques described herein. "?123" key 148 may be associated with an alternate character function of first graphical keyboard 142, such that gesture module 8 causes secondary keyboard module 10 to output, in response to selecting "?123" key 148, one or more keys of a graphical keyboard that include at least one character that is different than each character associated with each key from first graphical keyboard 142.

As illustrated in FIG. 5B, in response to selecting "?123" key 148, gesture module 8 may cause secondary keyboard module 10 to output, for contemporaneous display with first graphical keyboard 142, second graphical keyboard 160. As illustrated, second graphical keyboard 160 may include a second plurality of keys, such as "@" key 162 and "5" key 164. In this way, secondary keyboard module 10 may output second graphical keyboard 160 for contemporaneous display with first graphical keyboard 142 such that at least one character associated with at least one key of second graphical keyboard 160 is different than each character associated with each key of first graphical keyboard 142. In some examples, the display of second graphical keyboard 160 may be triggered by one of or combination of the techniques illustrated in FIGS. 4A-5B.

Figure 6:
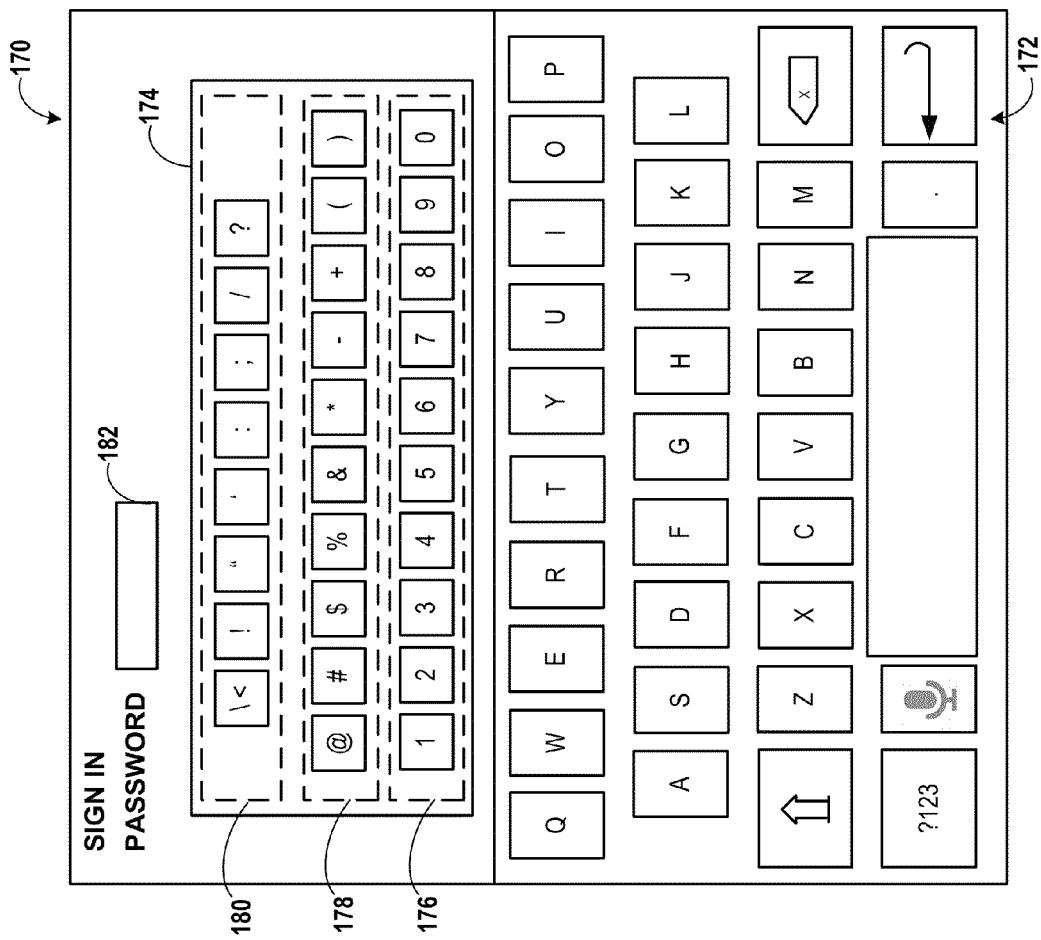
FIG. 6 illustrates an example computing device that may be used to output a second graphical keyboard for contemporaneous display with a first graphical keyboard, in accordance with one or more aspects of this disclosure.

FIG. 6 illustrates an example computing device that may be used to output a second graphical keyboard for contemporaneous display with a first graphical keyboard, in accordance with one or more aspects of this disclosure. As illustrated in FIG. 6, secondary keyboard module 10 may output, for display within GUI 170, first graphical keyboard 172 and second graphical keyboard 174, in accordance with techniques disclosed herein. Each of first graphical keyboard 172 and second graphical keyboard 174 may include a plurality of keys.

Secondary keyboard module 10 may determine, based at least in part on an input context, an arrangement of the second plurality of keys included in second keyboard 174. For instance, as illustrated in FIG. 6, secondary keyboard module 10 may determine an arrangement of the second plurality of keys including an arrangement of keys included in first row 176, second row 178, and third row 180. As an example, secondary keyboard module 10 may receive an indication of an identifier of password region 182 as an active input region of GUI 170. In response to receiving the indication of the identifier of password region 182, secondary keyboard module 10 may determine the illustrated arrangement of the second plurality of keys included in second keyboard 174 including number keys included in first row 176 positioned nearest first graphical keyboard 172. In this way, secondary keyboard module 10 may position those keys (e.g., number keys) that may be more likely to be selected, as determined by the input context, nearest first graphical keyboard 172. As such, secondary keyboard module 10 may enable a user to provide gesture input to select those keys that are more likely to be selected such that a distance between those keys and first graphical keyboard 172 is minimized.

While in the example of FIG. 6, the arrangement of the second plurality of graphical keys included in second keyboard 174 is illustrated with respect to an arrangement of keys within rows and rows within second graphical keyboard 174, aspects of this disclosure are not so limited. For example, secondary keyboard module 10 may determine other arrangements, such as arrangements that position symbol keys (e.g., non-numeric keys) closer to first graphical keyboard 172. Similarly, in certain examples, secondary keyboard module 10 may determine arrangements that include one or more numeric keys and/or one or more symbolic keys closer to first graphical keyboard 172, such as within first row 176.

Secondary keyboard module 10 may determine the arrangement of the second plurality of keys based at least in part on the input context. For instance, in response to receiving an indication of an identifier of an input region associated with a date region, secondary keyboard module 10 may determine an arrangement of the second plurality of keys that positions symbols commonly used for entry of dates nearer to first graphical keyboard 172 (e.g., an "/" key).

In this way, secondary keyboard module 10 may determine an arrangement of the second plurality of keys included in second keyboard 174 based at least in part on an input context, such that keys commonly used during entry of text corresponding to the input context are positioned closer to first keyboard 172 than keys that are less commonly used during entry of text corresponding to the input context. As such, secondary keyboard module 10 may help to decrease a length traversed by a gesture path to select at least one key included in first keyboard 172 and at least one key included in second keyboard 174. Accordingly, according to techniques described herein, secondary keyboard module 10 may help to increase the rate at which a user may enter text using a computing device.

Figure 7:
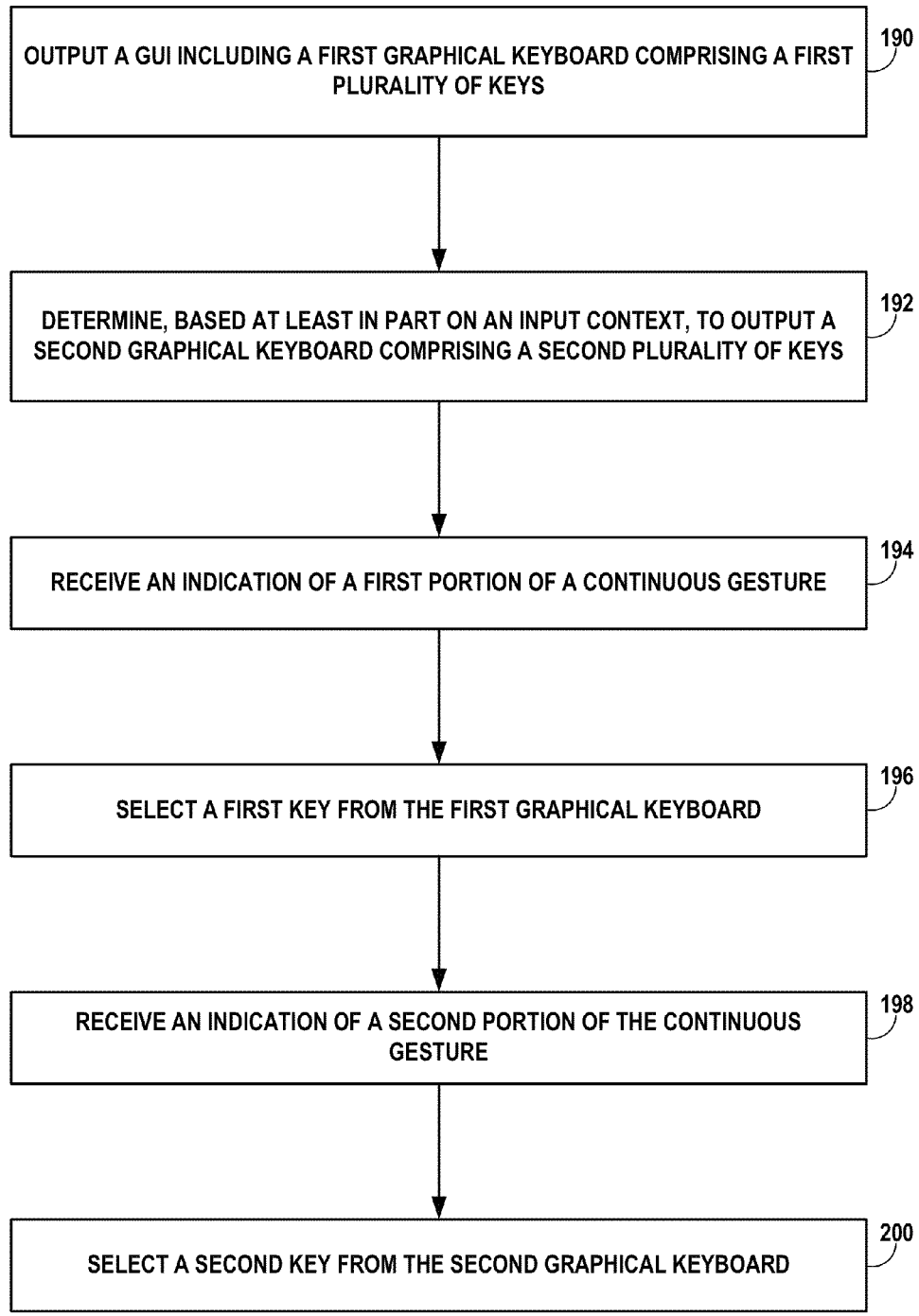
FIG. 7 is a flow diagram illustrating example operations of a computing device that may be used to output a second graphical keyboard for contemporaneous display with a first graphical keyboard, in accordance with one or more aspects of this disclosure.

FIG. 7 is a flow diagram illustrating example operations of a computing device that may be used to output a second graphical keyboard for contemporaneous display with a first graphical keyboard, in accordance with one or more aspects of this disclosure. For purposes of illustration only, the example operations are described below within the context of computing device 2, as shown in FIGS. 1 and 2.

UI module 6, executing on one or more processors 50 of computing device 2, may output, for display, a graphical user interface comprising a first graphical keyboard comprising a first plurality of keys (190). For example, UI module 6 may output, for display at UI device 4, GUI 12 including first graphical keyboard 14. First graphical keyboard 14 may include a first plurality of keys, such as "P" key 16, "A" key 18, and "S" key 20.

Secondary keyboard module 10 may determine, based at least in part on an input context, to output a second graphical keyboard comprising a second plurality of keys (192). As an example, secondary keyboard module 10 may determine, based at least in part on an input context including an identifier of password region 26, to display second keyboard 22. UI module 6 may output, for contemporaneous display with the first graphical keyboard, the second graphical keyboard (194). A character associated with at least one key from the second plurality of keys may be different than each character associated with each key from the first plurality of keys. For example, UI module 6 may output second keyboard 22 for contemporaneous display with first graphical keyboard 14. Second keyboard 22 may include a second plurality of keys. A character associated with at least one key from the second plurality of keys (e.g., a "5" character associated with "5" key 24) may be different than each character associated with each key from the first plurality of keys included in first graphical keyboard 14.

Gesture module 8 may receive an indication of a first portion of a continuous gesture detected at a presence-sensitive input device (194). For example, gesture module 8 may receive an indication of first portion 34 of continuous gesture 28 detected at UI device 4 (e.g., a presence-sensitive input device). Gesture module 8 may select, based at least in part on the first portion of the continuous gesture, a first key from the first plurality of keys of the first graphical keyboard as a first selected key (196). For instance, gesture module 8 may select, based at least in part on first portion 34 of continuous gesture 28, "A" key 18 from the first plurality of keys of first graphical keyboard 14 as a first selected key.

Gesture module 8 may receive an indication of a second portion of the continuous gesture detected at the presence-sensitive display (198). As an example, gesture module 8 may receive an indication of second portion 36 of continuous gesture 28 detected at UI device 4. Gesture module 8 may select, based at least in part on the second portion of the continuous gesture, a second key from the second plurality keys of the second graphical keyboard as a second selected key (200). For instance, gesture module 8 may select, based at least in part on second portion 36 of continuous gesture 28, "5" key 24 from the second plurality of keys of second graphical keyboard 22.

In one example, the input context comprises an identifier of an input region that is capable of receiving input. In one example, the identifier of the input region comprises an identifier of at least one of a password region, a uniform resource locator (URL) region, an email address region, a color region, a date region, a datetime region, a datetime-local region, a month region, a number region, a range region, a search region, a telephone number region, a time region, and a week region. In one example, the operations further include determining, by computing device 2, a candidate character string, wherein the candidate character string comprises at least a first character associated with the first selected key and a second character associated with the second selected key.

In one example, determining the candidate character string comprises determining the candidate character string without comparing the candidate character string to a language model that indicates a probability that the candidate character string represents a word included in a lexicon. In one example, the operations further include receiving, by computing device 2, an indication of a third portion of the continuous gesture detected at the presence-sensitive input device, wherein receiving the indication of the third portion of the continuous gesture comprises receiving the indication of the third portion of the continuous gesture prior to receiving the indication of the second portion of the continuous gesture. In such an example, determining to display the second graphical keyboard further comprises determining to display the second graphical keyboard based at least in part on determining, by computing device 2, that the third portion of the continuous gesture includes motion from a first location of the presence-sensitive input device corresponding to a first location of the first graphical keyboard to a second location of the presence-sensitive input device corresponding to a second location of the graphical user interface that is not associated with the first graphical keyboard.

In one example, the second location of the graphical user interface comprises a location of the graphical user interface that is positioned within a top region of the graphical user interface with respect to an orientation of the graphical user interface. In one example, the operations further include receiving, by computing device 2, an indication of a third portion of the continuous gesture detected at the presence-sensitive input device, wherein receiving the indication of the third portion of the continuous gesture comprises receiving the indication of the third portion of the continuous gesture prior to receiving the indication of the second portion of the continuous gesture, and selecting, by computing device 2 and based at least in part on the indication of the third portion of the continuous gesture, a third key of the first graphical keyboard associated with an alternate character function of the first graphical keyboard. In such an example, determining to display the second graphical keyboard further comprises determining to display the second graphical keyboard based at least in part on selecting the third key of the first graphical keyboard.

In one example, the graphical user interface comprises a first portion that includes the first graphical keyboard and a second, different portion that includes one or more of a text suggestion region and a text display region. In such an example, outputting the second graphical keyboard for contemporaneous display with the first graphical keyboard further comprises outputting the second graphical keyboard for display within the second portion of the graphical user interface as an alpha-blended overlay of one or more of the text suggestion region and the text display region.

In one example, outputting the second graphical keyboard for contemporaneous display with the first graphical keyboard further comprises determining, based at least in part on the input context, an arrangement of the second plurality of keys of the second graphical keyboard, and outputting the second graphical keyboard for contemporaneous display with the first graphical keyboard in accordance with the determined arrangement of the second plurality of keys of the second graphical keyboard. In one example, outputting the second graphical keyboard for contemporaneous display with the first graphical keyboard further comprises outputting, for display at the second graphical keyboard, an indication of a probability of selection of at least one key from the second plurality of keys of the second graphical keyboard.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable storage media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

The invention claimed is:

1. A method comprising:
    outputting, by a computing device and for display, a graphical user interface comprising a first graphical keyboard comprising a first plurality of keys, each key from the first plurality of keys associated with a respective character from a first plurality of characters;
    responsive to receiving an indication of a first portion of a continuous gesture that is detected at a presence-sensitive input device and traverses a first location associated with a first key, selecting, by the computing device, the first key from the first plurality of keys of the first graphical keyboard;
    responsive to receiving an indication of a second portion of the continuous gesture that traverses a second location of a second key of the first graphical keyboard associated with an alternate character function of the first graphical keyboard prior to a third portion of the continuous gesture, outputting, by the computing device and for contemporaneous display with the first graphical keyboard, a second graphical keyboard comprising a second plurality of keys, each key from the second plurality of keys associated with a respective character from a second plurality of characters, wherein each character from the second plurality of characters is different than each character from the first plurality of characters;
    responsive to receiving an indication of the third portion of the continuous gesture that is detected at the presence-sensitive input device and traverses a third location associated with a third key, selecting by the computing device, the third key included in the second plurality of keys of the second graphical keyboard;
    responsive to receiving an indication of a fourth portion of the continuous gesture that is detected at the presence-sensitive input device and traverses a fourth location associated with a fourth key, selecting by the computing device, the fourth key included in the first plurality of keys of the first graphical keyboard;
    determining, by the computing device and based on the continuous gesture that traverses the first graphical keyboard and the second graphical keyboard to select the first key, second key, third key, and fourth key, a candidate character string, wherein the candidate character string comprises at least a first character associated with the first key, a second character associated with the third key, and a third character associated with the fourth key; and
    outputting, by the computing device and for display, a representation of the candidate character string.

2. The method of claim 1, wherein the input context comprises an identifier of an input region that is capable of receiving input.

3. The method of claim 2, wherein the identifier of the input region comprises an identifier of at least one of a password region, a uniform resource locator (URL) region, an email address region, a color region, a date region, a datetime region, a datetime-local region, a month region, a number region, a range region, a search region, a telephone number region, a time region, and a week region.

4. The method of claim 1, wherein determining the candidate character string comprises determining the candidate character string without comparing the candidate character string to a language model that indicates a probability that the candidate character string represents a word included in a lexicon.

5. The method of claim 1,
    wherein the graphical user interface comprises a first portion that includes the first graphical keyboard and a second, different portion that includes one or more of a text suggestion region and a text display region, and
    wherein outputting the second graphical keyboard for contemporaneous display with the first graphical keyboard further comprises outputting the second graphical keyboard for display within the second portion of the graphical user interface as an alpha-blended overlay of one or more of the text suggestion region and the text display region.

6. The method of claim 1, wherein outputting the second graphical keyboard for contemporaneous display with the first graphical keyboard further comprises:
    determining, based at least in part on the input context, an arrangement of the second plurality of keys of the second graphical keyboard; and
    outputting the second graphical keyboard for contemporaneous display with the first graphical keyboard in accordance with the determined arrangement of the second plurality of keys of the second graphical keyboard.

7. The method of claim 1, wherein outputting the second graphical keyboard for contemporaneous display with the first graphical keyboard further comprises outputting, for display at the second graphical keyboard, an indication of a probability of selection of at least one key from the second plurality of keys of the second graphical keyboard.

8. A device comprising:
    at least one processor; and
    at least one module operable by the at least one processor to:
        output, for display, a graphical user interface comprising a first graphical keyboard comprising a first plurality of keys;
        responsive to receiving an indication of a first portion of a continuous gesture that is detected at a presence-sensitive input device and traverses a first location associated with a first key, select, the first key from the first plurality of keys of the first graphical keyboard;
        responsive to receiving an indication of a second portion of the continuous gesture that traverses a second location of a second key of the first graphical keyboard associated with an alternate character function of the first graphical keyboard prior to a third portion of the continuous gesture, output, for contemporaneous display with the first graphical keyboard, a second graphical keyboard comprising a second plurality of keys;
        responsive to receiving an indication of the third portion of the continuous gesture that is detected at the presence-sensitive input device and traverses a third location associated with a third key, select the third key included in the second plurality of keys of the second graphical keyboard;
        responsive to receiving an indication of a fourth portion of the continuous gesture that is detected at the presence-sensitive input device and traverses a fourth location associated with a fourth key, select the fourth key included in the first plurality of keys of the first graphical keyboard;
        determine, based on the continuous gesture that traverses the first graphical keyboard and the second graphical keyboard to select the first key, second key, third key, and fourth key, a candidate character string, wherein the candidate character string comprises at least a first character associated with the first key, a second character associated with the third key, and a third character associated with the fourth key; and output, for display, a representation of the candidate character string.

9. The device of claim 8, wherein the input context comprises an identifier of an input region that is capable of receiving input.

10. The device of claim 9, wherein the identifier of the input region comprises an identifier of at least one of a password region, a uniform resource locator (URL) region, an email address region, a color region, a date region, a datetime region, a datetime-local region, a month region, a number region, a range region, a search region, a telephone number region, a time region, and a week region.

11. The device of claim 8, wherein the at least one module is operable by the at least one processor to determine the candidate character string by at least being operable by the at least one processor to determine the candidate character string without comparing the candidate character string to a language model that indicates a probability that the candidate character string represents a word included in a lexicon.

12. A non-transitory computer-readable storage medium encoded with instructions that, when executed, cause at least one processor of a computing device to:

output, for display, a graphical user interface comprising a first graphical keyboard comprising a first plurality of keys;

responsive to receiving an indication of a first portion of a continuous gesture that is detected at a presence-sensitive input device and traverses a first location associated with a first key, selecting, by the computing device, the first key from the first plurality of keys of the first graphical keyboard;

output, for contemporaneous display with the first graphical keyboard, based at least in part on an input context, a second graphical keyboard comprising a second plurality of keys, wherein each character associated with at least one key from the second plurality of keys is different than each character associated with each key from the first plurality of keys;

responsive to receiving an indication of a second portion of the continuous gesture that is detected at the presence-sensitive input device and traverses a second location associated with a second key, selecting by the computing device, the second key included in the second plurality of keys of the second graphical keyboard;

responsive to receiving an indication of a third portion of the continuous gesture that is detected at the presence-sensitive input device and traverses a third location associated with a third key, selecting by the computing device, the third key included in the first plurality of keys of the first graphical keyboard;

determine, based on the continuous gesture that traverses the first graphical keyboard and the second graphical keyboard to select the first key, second key, and third key, a candidate character string, wherein the candidate character string comprises at least a first character associated with the first key and a second character associated with the third key; and output, for display, a representation of the candidate character string.

13. The non-transitory computer-readable storage medium of claim 12, wherein the input context comprises an identifier of an input region that is capable of receiving input.

14. The non-transitory computer-readable storage medium of claim 13, wherein the identifier of the input region comprises an identifier of at least one of a password region, a uniform resource locator (URL) region, an email address region, a color region, a date region, a datetime region, a datetime-local region, a month region, a number region, a range region, a search region, a telephone number region, a time region, and a week region.

* * * * *